United States Patent [19]

Morgan et al.

[11] Patent Number: 4,879,446
[45] Date of Patent: Nov. 7, 1989

[54] INTERNAL WIRE GUIDE FOR GTAW WELDING

[75] Inventors: Gene E. Morgan, Camarillo; Gerald E. Dyer, Canoga Park, both of Calif.

[73] Assignee: The United States of America as represented by the Administrator of the National Aeronautics and Space Administration, Washington, D.C.

[21] Appl. No.: 279,625

[22] Filed: Dec. 5, 1988

[51] Int. Cl.⁴ .................................................. B23K 9/16
[52] U.S. Cl. ........................................ 219/75; 219/136
[58] Field of Search .................................. 219/75, 136

[56] References Cited

U.S. PATENT DOCUMENTS

| | | | |
|---|---|---|---|
| 4,048,465 | 9/1977 | Manz | 219/75 |
| 4,136,273 | 1/1979 | Eujita et al. | 219/75 |
| 4,147,917 | 4/1979 | Jelmorini | 219/75 |
| 4,205,215 | 5/1980 | Willems | 219/75 |
| 4,234,778 | 11/1980 | Willems et al. | 219/75 |
| 4,532,406 | 7/1985 | Povlick et al. | 219/75 |

*Primary Examiner*—Clifford C. Shaw
*Attorney, Agent, or Firm*—William J. Sheehan; John R. Manning; Charles E. B. Glenn

[57] ABSTRACT

A welding torch for gas tungsten arc welding apparatus has a filler metal wire guide positioned within the torch, and within the shielding gas nozzle. The wire guide is adjacent the tungsten electrode and has a ceramic liner through which the wire is fed. This reduces the size of the torch and eliminates the outside clearance problems that exist with external wire guides. Additionally, since the wire is always within the shielding gas, oxidizing of the wire is eliminated.

5 Claims, 1 Drawing Sheet

INTERNAL WIRE GUIDE FOR GTAW WELDING

ORIGIN OF THE INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

This invention relates to gas tungsten arc welding (GTAW), and more particularly to a wire guide which is disposed within the welding torch.

Gas tungsten arc welding (GTAW) is a process wherein coalescence of metals is produced by heating them with an arc between an nonconsumable tungsten electrode and the work. A filler metal is utilized at least in those instances where the welding process is automatic or semi-automatic and where the base material to be welded is relatively thick, the filler material being a welding rod or wire which is conventionally fed through a conduit external of the gas nozzle which surrounds the tungsten electrode. Shielding of the electrode and the weld zone is obtained from an inert gas such as argon or helium which is fed through the nozzle so as to prevent oxidizing of the electrode, the filler wire and the weld material which would occur rapidly if exposed to air during welding. The GTAW process is especially useful for joining aluminum and magnesium which form refractory oxides, and also for the reactive metals such as titanium and zirconium. Because of the high quality weld provided for the above mentioned materials, the gas tungsten arc welding process is used extensively in the aircraft and aerospace industry.

One of the difficulties with the prior art GTAW apparatus is that the filler metal, which is in the form of a small diameter rod or wire, is fed through a guide which, as aforesaid, is external of the gas nozzle. Because of this outside clearance problems are encountered when welding in confined portions of workpieces, and additionally in certain instances the wire may not be completely shielded by the shielding gas and becomes exposed to air so as to contaminate the weld metal thereby resulting in an improper weld.

SUMMARY OF THE INVENTION

Consequently, it is a primary object of the present invention to provide gas tungsten arc welding apparatus having a guide for the filler metal wire which is internal of the electrode housing.

It is another object of the present invention to provide a wire guide for gas tungsten arc welding apparatus which extends within the shielding gas nozzle so that the wire is always in the shielding gas.

It is a further object of the present invention to provide a filler metal wire guide for gas tungsten arc welding apparatus which is disposed internally of the welding torch adjacent the electrode.

Accordingly, the present invention provides a welding torch for gas tungsten arc welding apparatus having the filler metal wire guide positioned within the welding torch cross sectional profile, the wire guide and the wire fed therethrough at all times being within the shielding gas envelope. This not only eliminates the outside clearance problems that exist with conventional external wire guides, but also eliminates exposure of the wire to an oxidizing environment. In the specific form of the invention, the wire guide is disposed parallel to the tungsten electrode, and the wire extends through the guide has a ceramic insulator.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
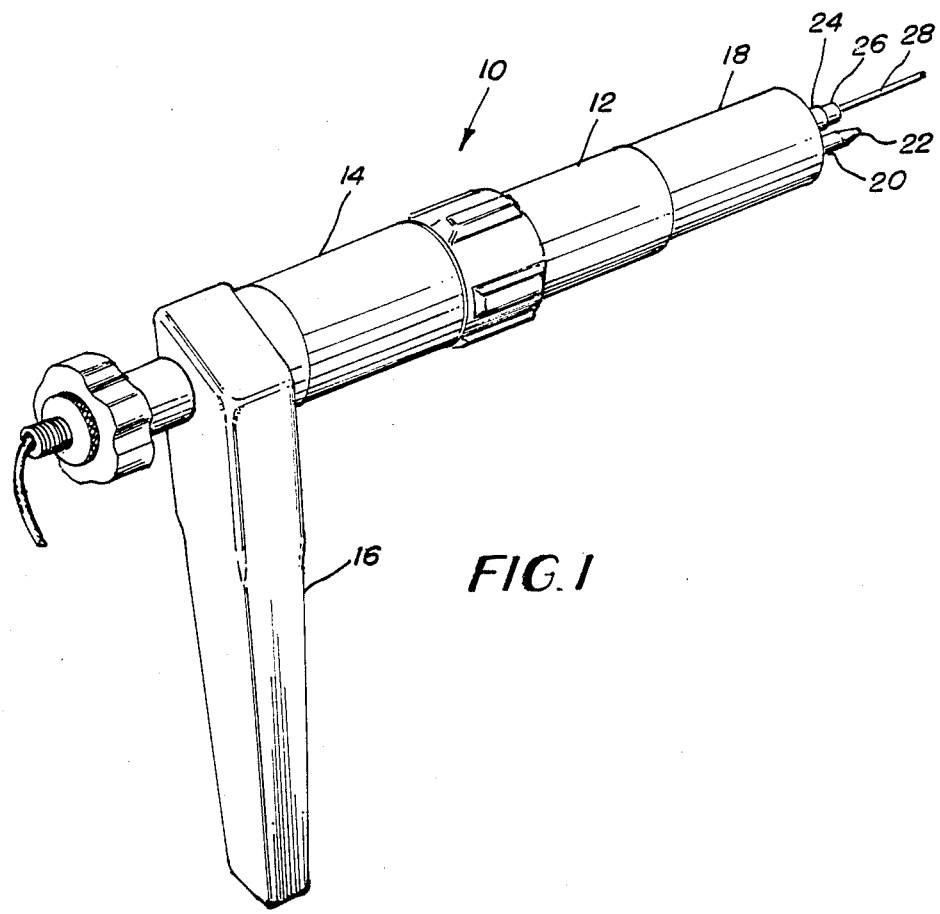
FIG. 1 is a perspective view of a gas tungsten arc welding apparatus having a wire guide constructed in accordance with the principles of the present invention.
Figure 2:
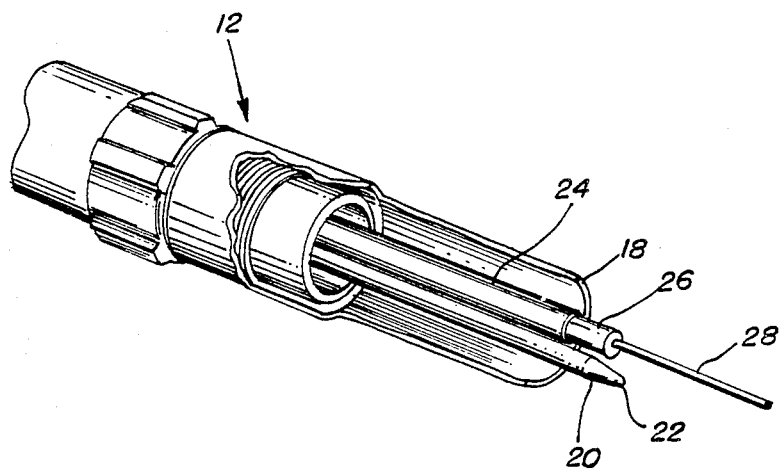
FIG. 2 is a fragmentary perspective view partly broken away illustrating the wire guide of the present invention within the welding torch.

Referring to the drawings, FIG. 1 illustrates gas tungsten arc welding apparatus 10 comprising a welding torch 12 carried by a housing 14 which may be supported by a holding member 16 or the like as is conventional. The torch 12 includes a nozzle 18 through which an inert shielding gas such as argon or helium or mixtures thereof is fed from a supply through a conduit extending through the housing 14, the nozzle being disposed about a tungsten electrode 20 applied from an electrical power source through an electrical conductor also extending through the housing 14.

The electrode 20 may be pure tungsten or tungsten alloy rod containing a small percentage of thoria or zirconia, the requirements for the electrode being specified in ASW A5.12, Specification For Tungsten Arc-Welding Electrodes. Thus, although the term tungsten is used herein, it should be understood that this term is not intended to be limited to pure tungsten, but includes all the known tungsten alloys conventionally used for GTAW electrodes.

Conventionally, a welding rod or wire is used as a filler metal during the GTAW process and such rod or wire is fed to the welding zone adjacent the tip 22 of the electrode 20 through a guide in the form of a conduit which is generally attached to the outside of the housing 14 and outside the nozzle 18. However, as aforesaid, such external guides may get in the way and present clearance problems when welding certain workpieces and also may expose portions of the wire to the environment outside the shielding gas thereby resulting in oxidation of the wire and thus a poor weld.

According to the present invention a wire guide 24 is supported within the housing 12 disposed internally of the nozzle 18. The guide 24 is an axially extending cylindrical conduit having its axis disposed parallel to the axis of the electrode 20 and has a liner in the form of a ceramic insulator 26 through which the wire 28 is fed. The insulator 26 acts to electrically insulate the wire 28 from the metal of the guide conduit 24 and the specific material is not critical to the invention.

Since the guide is disposed within the GTAW torch nozzle 18, the wire is always within the envelope of the shielding gas so that problems resulting from oxidizing of the wire encountered in the prior art are eliminated. Thus, the invention overcomes difficulties encountered with prior art GTAW apparatus and has wide application wherever the GTAW process is utilized.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a welding torch for gas tungsten arc welding apparatus comprising a housing for supporting an axially extending annular nozzle having an exhaust opening at one end and an axially extending tungsten electrode, said electrode being disposed substantially coaxially within the nozzle, means for supplying electricity to said electrode and means for supplying an inert gas to said nozzle for shielding said electrode from oxidizing conditions, the improvement comprising an axially elongated filler metal wire guide disposed internally within said housing and extending entirely through said nozzle spaced from the periphery of the nozzle, the axis of elongation of said guide within said nozzle always being substantially parallel to said electrode, and said guide and said electrode projecting through said nozzle beyond said one end.

2. In a welding torch as recited in claim 1, wherein said guide comprises a conduit having a liner formed from electrically insulated material coaxial therewith, said liner having a central bore through which said wire may be fed substantially parallel to the axis of said electrode.

3. In a welding torch as recited in claim 2, wherein said liner is ceramic.

4. In a welding torch as recited in claim 1, wherein said guide comprises a conduit having a liner formed from electrically insulated material coaxial therewith, said liner having a central bore through which said wire may be fed substantially parallel to the axis of said electrode.

5. In a welding torch as recited in claim 4, wherein said liner is ceramic.

* * * * *